United States Patent [19]

Gerhardt

[11] Patent Number: 4,613,293

[45] Date of Patent: Sep. 23, 1986

[54] BELT-TYPE PRESS FOR MAKING PARTICLEBOARD, FIBERBOARD, AND LIKE PRESSEDBOARD PRODUCTS

[75] Inventor: Klaus Gerhardt, Rheûrdt, Fed. Rep. of Germany

[73] Assignee: G. Siempelkamp GmbH & Co., Krefeld, Fed. Rep. of Germany

[21] Appl. No.: 767,955

[22] Filed: Aug. 21, 1985

[30] Foreign Application Priority Data

Sep. 5, 1984 [DE] Fed. Rep. of Germany ....... 3432548

[51] Int. Cl.$^4$ .......................... B30B 5/06; B29D 7/14; A23G 1/20

[52] U.S. Cl. ..................................................... 425/371

[58] Field of Search ................ 425/329, 335, 371, 373

[56] References Cited

U.S. PATENT DOCUMENTS 3,883,285 5/1975 DeMets ............................... 425/371
4,015,921 4/1977 DeMets ............................... 425/371
4,283,246 8/1981 Held ................................ 425/371 X
4,457,683 7/1984 Gerhardt ............................. 425/373
4,468,188 8/1984 Gerhardt ............................. 425/371
4,480,978 11/1984 Gerhardt ............................. 425/371
4,548,133 10/1985 Held ................................ 425/371 X

FOREIGN PATENT DOCUMENTS 3119529 12/1982 Fed. Rep. of Germany .

*Primary Examiner*—J. Howard Flint, Jr.
*Attorney, Agent, or Firm*—Karl F. Ross; Herbert Dubno

[57] ABSTRACT

A continuously operable belt-type press for making particleboard, fiberboard and the like pressedboard products comprises an endless upper press belt circulated over at least one upper belt guide roller, a corresponding endless lower press belt circulated over at least one lower belt guide roller, these press belts forming a pressing gap in a pressing region, and a press framework having a lower and upper platen as well as a drive mechanism. The rod circulating mechanisms each comprise two first chains each guided over at least one sprocket and at least one first chain drive wheel with support bolts for connection of the rolling rods, chain link members with chain bolts therein, outer running rollers mounted on the chain bolts, and guide rails for the running rollers. In the entrance region of the pressing gap and of the upper and lower platens correspondingly two second chains comprising a plurality of chain rollers in triangular configuration are positioned each guided over at least one second chain guide wheel. The chain link members are provided with rolling rod holders on their ends furthest from the guide rails, in the pressing region their ends closest to the press belt, which allow an equalizing free play for the rolling rods.

8 Claims, 7 Drawing Figures

BELT-TYPE PRESS FOR MAKING PARTICLEBOARD, FIBERBOARD, AND LIKE PRESSEDBOARD PRODUCTS

CROSS REFERENCE TO COPENDING APPLICATION

This application is related to my commonly assigned copending application Ser. No. 786,026.

FIELD OF THE INVENTION

My present invention relates to continuously operable presses used for making particleboard, fiberboard, pressedboard products, and the like. More particularly it is related to continuously operable belt-type presses, in which a mat comprising a mixture containing wood chips, fibers, particles, and the like is pressed to produce a rigid board, for example a particleboard, fiberboard, or the like.

BACKGROUND OF THE INVENTION

Belt-type presses for making particleboard, fiberboard, and the like known in the prior art related to our invention generally comprise an endless upper press belt, preferably a steel press belt, circulated over at least one upper belt guide roller, a corresponding endless lower press belt, preferably a steel press belt, circulated over at least one lower belt guide roller, these press belts forming a pressing gap in a pressing region of the belt-type press, and a press framework having a lower and an upper platen as well as a drive mechanism. In the pressing region between each of the platens and its corresponding press belt a rod supply is positioned in which a plurality of rolling rods are fed with spacing from each other, and are guided over a circulation path with the aid of either an upper or lower rod circulation mechanism.

Each rod circulating mechanism comprises two first or main chains each guided over at least one sprocket and at least one first chain drive wheel, a plurality of interlocked chain link members having chain bolts attached therein, a plurality of outer running rollers mounted on the chain bolts, and at least one guide rail for the running rollers, the rolling rods being attached between the two first chains with equalizing free play.

At least one end of each of the rolling rods has a recess bored therein, in which each one of a plurality of support rods attached to the first chains engage so as to provide the equalizing free play.

At an entrance region of the pressing gap and of the platens a second chain, comprising a plurality of chain rollers in a triangular configuration guided over at least one second chain guide wheel, is positioned, over the chain rollers of which the rolling rods between the first chains are guided as with roller bearings.

The press products can include also laminates, rubber products, plastics and the like.

In the belt-type presses of the prior art, as taught in German patent document DE-OS No. 31 19 529 (see also U.S. Pat. No. 4,480,978, No. 4,457,683 and No. 4,468,188), the upper and lower guide mechanism has two first chains guided in synchronization over first chain guide wheels or sprockets whose link members are forced together in a zig-zag shape in the pressing region, whereby an equalizing free play originates.

The rolling rods are attached to the articulations or pivot joints of the adjacent link members at the press belt side of the first chains, and running rollers are supported on the pivot joints or articulations on the press platen side of the first chain.

The first chain extending in the return path behind the pressing region and the draw chain for the rolling rods are guided back over the sprocket to the entrance mechanism. The entrance mechanism comprises a driven sprocket and a sliding wheel cooperating with it with connected guide bars for at least the running rollers.

The guide bars guide the rolling rods until they reach the entrance of the pressing region. In this way the rolling rods do not undergo guiding force in the pressing region. This known press embodiment uses the fact, that the rolling rods run undisturbed in the pressing region, when they are formed in an adequate cylindrical form, and that care must be taken that they are input exactly perpendicular to the circulating direction.

The known presses which have proved to be good, demand however that the first chains, which are collapsed or forced together in a zig-zag shape, and the corresponding steps for the sliding together, be used.

Moreover practice demands particularly with very long condinuously operable presses, an extremely precise input of the rolling rods, and of course with narrow tolerances required, perpendicularly to the circulating direction of the rolling rods. But the prior art presses of this type can be improved. Usually the known belt-type presses of this kind are additionally provided at the entrance end of the press with an inlet press, which has a plurality of circulating second chains or press bands, which are distributed with clearance from each other over the width of the press belts, wherein the rolling rods are supported in the entrance region on the chain rollers of the second chains.

OBJECTS OF THE INVENTION

My invention is based on a desire to provide a belt-type press of the above described kind but wherein the first chains are no longer required to be zig-zag shaped and so that the rolling rods can be introduced in the proper orientation without difficulty and with due precision in the pressing region.

It is an object of my invention to provide an improved belt-type press for making pressboard, particleboard, fiberboard, laminates and the like.

It is a further object of my invention to provide a belt-type press for making fiberboard, particleboard, or the like pressboard, wherein an exact alignment of the rolling rods of the first chain perpendicularly to the circulating direction on their introduction into the press region can be ensured even for very large presses.

Another object is to overcome drawbacks of the prior art.

SUMMARY OF THE INVENTION

These objects and others which will become more apparent hereinafter are attained in accordance with our invention in a belt-type press for making particleboard, fiberboard, pressedboard, laminates, and the like comprising an endless upper press belt, preferably a steel press belt, circulated over at least one upper belt guide roller, a corresponding endless lower press belt, preferably a steel press belt, circulated over at least one lower belt guide roller, these upper and lower press belts being positioned to form a pressing gap between the upper and lower press belts in a pressing region, and a press framework having a lower and an upper platen as well as a drive mechanism.

In the pressing region between each of the platens and its corresponding press belt a rod supply is positioned from which a plurality of rolling rods are fed with spacing from each other, and are guided with a rod circulating mechanism.

Each rod circulating mechanism comprises two first or main chains each guided over at least one sprocket and at least one chain drive wheel, a plurality of interlinked chain link members having a plurality of chain bolts, a plurality of outer running rollers mounted on the chain bolts, and at least one guide rail for the running rollers, the rolling rods being attached between the two first chains with equalizing free play.

At least one end of each of the rolling rods has a recess bored therein, in which each one of a plurality of pins attached to the first chains engage so as to provide the equalizing free play.

At an entrance region of the pressing gap and of the platens corresponding to and associated with each press belt a second chain comprising a plurality of chain rollers in a triangular configuration is guided over at least one second chain guide wheel and has chain rollers bracing the rolling rods in the region between the sprocket chains are guided similar to roller bearings.

According to my invention each of the chain link members are provided with at least one rolling rod holder on the end of these chain link members furthest from the guide rails and closest to the press belts in the pressing region, the rolling rod holder allowing the equalizing free play.

Furthermore the first chains have a chain bolt play between the chain bolts and the chain link members, and the second chains constitute positioning or aligning means enabling the rolling rods to be aligned perpendicularly to the circulating direction of the rolling rods, and are constructed so as to be partly flexible with a suitable compensating play. That permits operation of the chains in a more controlled, but flexible manner.

According to a preferred embodiment of my invention the rolling rod holders are fitted to the chain link members, and, depending on the dimensions of the components of the first chains, have a plurality of elongated support bolt holes running in the circulating direction of the first chain elongated so as to provide equalizing free play; the support bolts of the rolling rods are inserted in the elongated support bolt holes; and are held in each chain link member by a centering spring and centered contact-free with respect to the circulating direction.

According to another preferred embodiment of my invention the rolling rod holders are formed as centering spring attached to the chain link members.

One can however provide a combination of these features. My invention operates with a compensating play built into the chain aggregate (namely with the second chain constructed as an aligning chain and no longer functioning as an entrance press) causing precise input of the rolling rods perpendicular to the circulating direction and allowing a very precise alignment of the rolling rods, since according to my invention to the one hand the support bolts of the rolling rods mounted in the rolling rod holder are inserted in elongated support bolt holes and are centered therein contact-free by the centering spring, and on the other hand the first chains are equipped with a chain bolt play.

This combination allows chains with the zig-zag shaped collapsed form to be dispensed with and replaced, and results in a considerable improvement of the precision of the input of the rolling rods into the pressing region and therefore in the pressing gap. This precision depends only on the precision of the chain aggregated, which are built into the aligning chains, and of the precision with which this chain aggregate is guided and is aligned.

According to another preferred embodiment of my invention each of the rolling rod holder's has two elongated support bolt holes and two of said rolling rods are suppored thereby. In another embodiment each chain link member has a mounting bar, on which the centering spring is mounted, the centering spring being substantially M-shaped, having two curved legs shaped so as to engage and fit two adjacent support bolts. Advantageously both the rolling rod holder and centering spring are placed on the chain link members.

The chain bolt play desired in our invention can be provided in a variety of ways. According to a preferred embodiment of our invention every second chain link members has a plurality of elongated chain bolt holes for the chain bolts, the elongated chain bolt holes being elongated and distributed in the circulating direction of the rolling rods, so as to provide the chain bolt play. In another embodiment of my invention the second chain has chain rollers rolling on each other and by that provides the equalizing free play to the first chains. In this embodiment they can take a very high load, which bears indirectly on the chain rollers, which however the links of the second chain do not carry.

According to the length of the chain rollers in the second chain at least one guide wheel at the entrance end of the second chain can be provided on at least one side with an additional toothed wheel, in whose tooth gaps the rolling rods engage. That provides an increase in the input precision. Usually the rolling rods are rotatable on the support bolts and the support bolts are nonrotatably mounted in the rolling rod holder.

BRIEF DESCRIPTION OF THE DRAWING

The above and other objects, features, and advantages of my invention will become more readily apparent from the following description, reference being made to the accompanying drawing in which.

SPECIFIC DESCRIPTION

Figure 1:
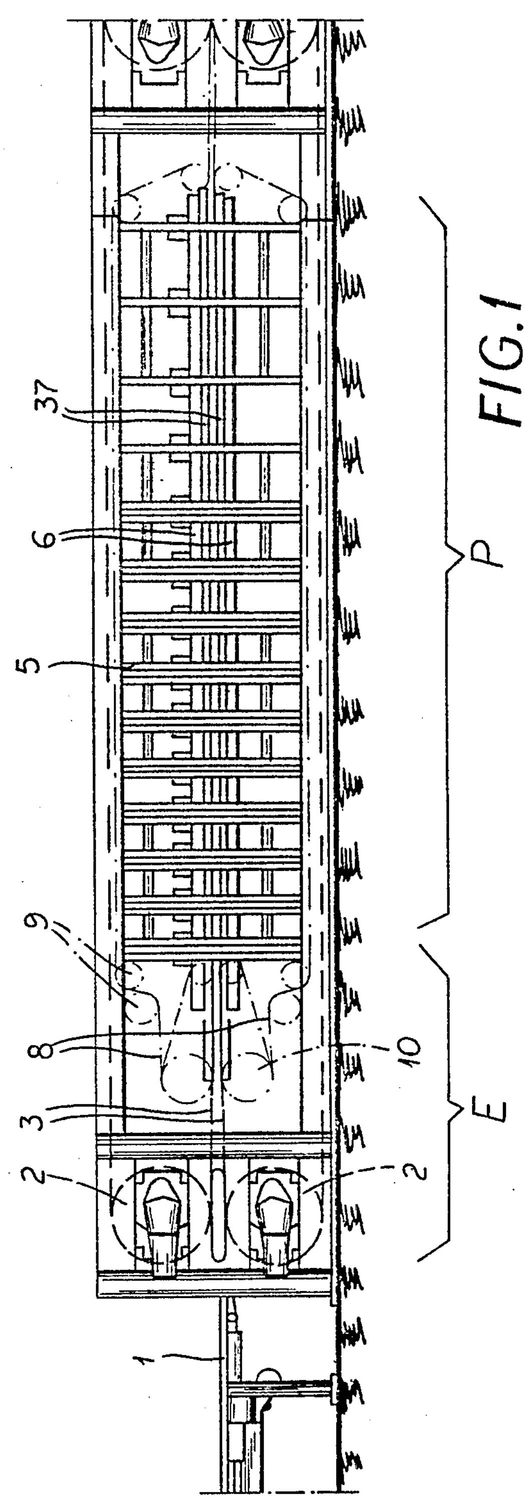
FIG. 1 is a side view of a preferred embodiment of a belt-type press according to my invention.

The continuously operable belt-type press shown in FIG. 1 serves to continuously press a mat of particles and binder into a rigid pressboard, for example fiberboard, particleboard, and the like pressedboard.

Usually the material to be pressed is scattered on a suitable feed belt to form a mat containing the wood fibers, chips or the like.

The belt-type press comprises endless upper and lower steel press belts 3 running over upper and lower guide rollers 2. These steel press belts 3 define a pressing gap 4. The press framework 5 has an upper and lower platen 6, wherein in this preferred embodiment each platen 6 is provided with unshown platen heating means.

Figure 2A:
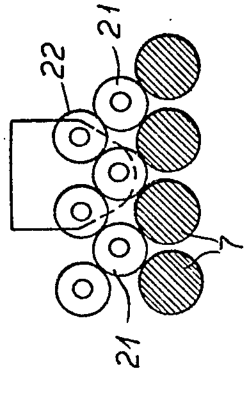
FIG. 2A is an illustration of the manner in which the rods are braced by the rollers of the respective second chain.
Figure 2:
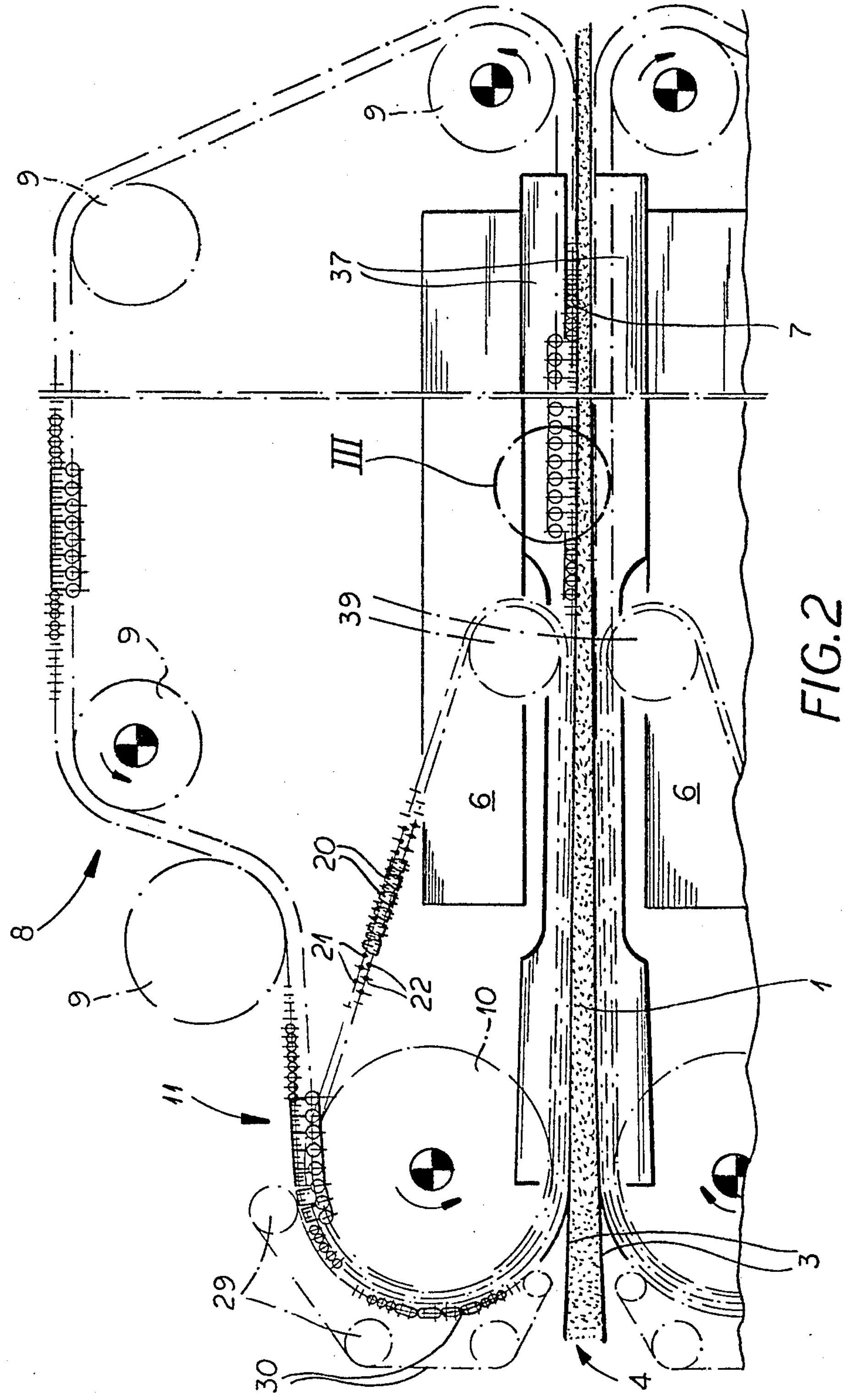
FIG. 2 is an enlarged side view of a portion of the apparatus of FIG. 1 showing the first and second chains in greater detail.

As seen in FIG. 2 in the pressing region P between the platens 6 and the steel press belts 3 an upper and lower rod container 37 from which rolling rods 7 are guided with spacing from each other are positioned, which with the aid of an upper and lower rod circulating mechanism 8 are guided along a circulation path.

Figure 3:
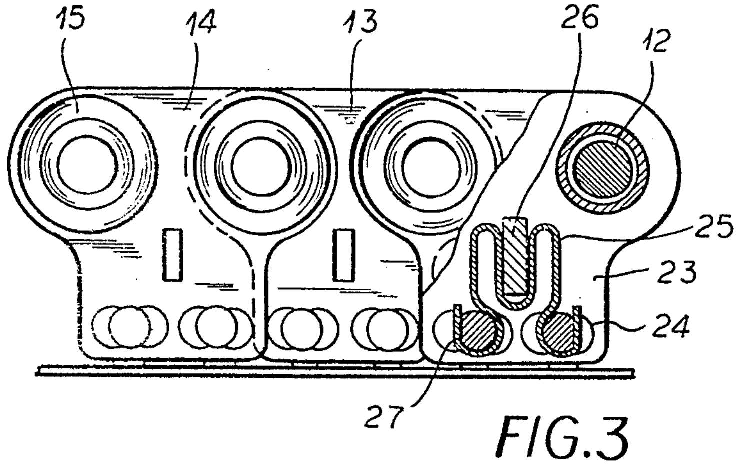
FIG. 3 is an enlarged cutaway view of a portion A of the apparatus of FIG. 2 showing in greater detail the structure of the first chain.
Figure 4:
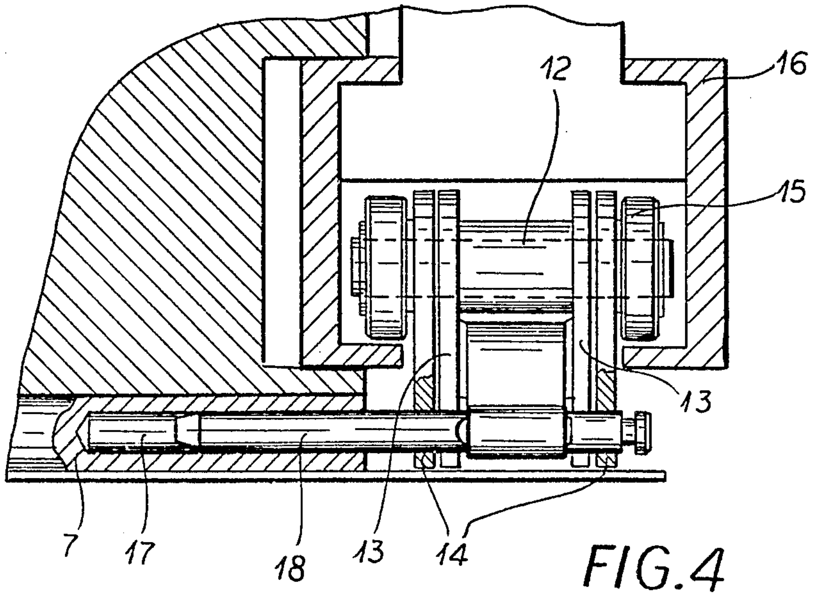
FIG. 4 is an enlarged cross sectional view of the guide of the first chain in a press according to my invention in a plane perpendicular to that of FIG. 3.

The rod circulating mechanisms 8 each comprise two first chains 11 with chain bolts 12 guided over sprockets 9 and at least one first chain drive wheel 10, the combined chain link members (that is, inner link member 13 and outer link member 14) and outer running rollers 15 mounted on the chain bolts 12, and finally the guide rails 16 on which the running rollers 15 travel. As seen in FIGS. 3 and 4 the rolling rods 7 are attached between two first chains 11 with equalizing free play. At least one end of each of the rolling rods 7 has a recess 17 bored therein, in which one of a plurality of support bolts 18 attached to the first chains 11 engage. The support bolts 18 are of a suitable dimension so as to provide the equalizing free play.

Second chain 20 with chain rollers 21 and 22 arranged in a triangular configuration circulating around the second chain guide wheels 19 and 30, of which at least one is driven, are provided in the entrance region E of the pressing gap 4 as well as of the upper and lower platen 6. On the chain rollers 21 the rolling rods 7 are run similar to roller bearings between the sprocket chains 11.

Particularly from a comparison of FIGS. 1 and 2 one sees that the chain link members 13 and 14 on their ends closest to the steel press belts 3 in the pressing region and furthest from the guide rails 16, are provided with extending rolling rods holders 23, which have, depending on the dimensions of the first chain components, elongated holes 24 running in the circulating direction of the first chain 11. Moreover the support bolts 18 of the rolling rods 7 are inserted into the elongated holes 24 and held therein.

They are centered contact free in the circulating direction by a centering spring 25 held in the chain link members 13 and 14 as seen in FIGS. 3 and 4. The combination of the rolling rod holder 23 with the rolling rod holder 25 formed as a centering spring is pointed out here.

The first chain 11 has a chain bolt free play between the chain bolt 12 and the combined link members 13 and 14, which will be explained further below. The roller chains 20 fulfill a particular function, namely operating as an aligning chain 20 for aligning rolling rods 7 perpendicularly to their circulating direction. In this example and according to a preferred embodiment of my invention each rolling rod holder 23 has two elongated holes 24 and two rolling rods 7. The chain link members 13 and 14 are provided with a mounting bar 26, on which a substantially M-shaped centering spring 25 is put, which engages with appropriately curved legs 27 the support bolt 18. In this way it is guaranteed that the rolling rods 7 in reverse operation and until they are engaged by the aligning second chain 20 and/or in the pressing region P are held fixed centrally in the elongated holes 24, and are also centered contact free in the circulating direction.

Figure 5:
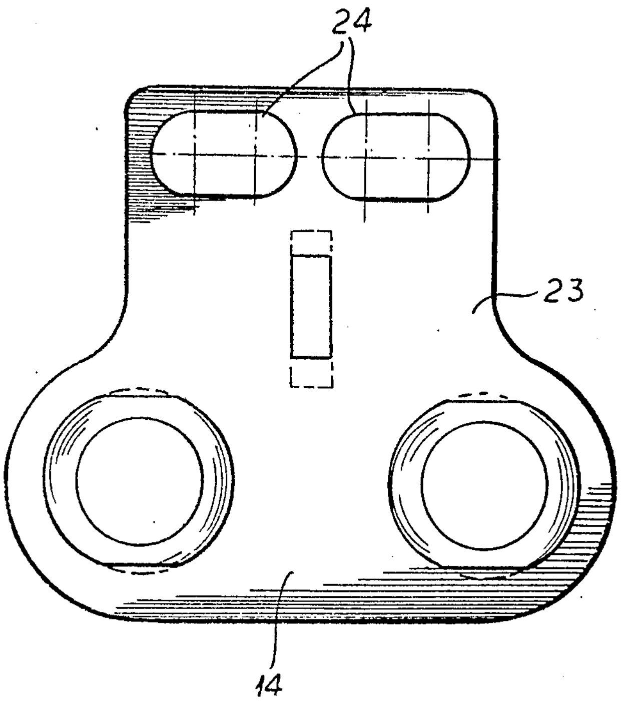
FIGS. 5 and 6 are side views of chain link members of the first chain drawn to even greater scale.
Figure 6:
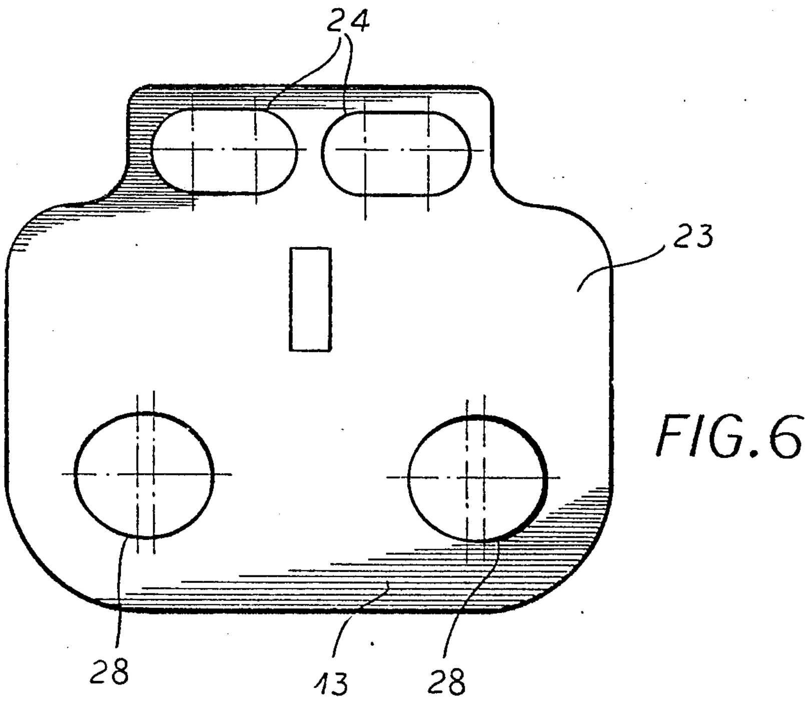

From FIGS. 5 and 6 one sees, that every second chain link member 14 of the first or sprocket chain 11 has chain bolt hole 28 for round chain bolts 12 elongated in the circulating direction of first chain 11, which defines the chain bolt free play. Consequently the first chain 11 can be guided around the sprocket 9, without disturbing forces on the aligning chain 20, which is performed with equalizing free play, and it is guaranteed that, in connection with this circulating and/or guiding an exact alignment of the rolling rods perpendicular to the circulating direction occurs.

In FIG. 2 one learns that the second chain 20 has chain rollers 21 and 22 rolling on each other and therefore a compensating free play is provided. It is in the scope of my invention to provide the entrance end second chain guide wheel 19 for the second chain 20 on at least one side thereof with an additional toothed wheel, in whose tooth gaps the rolling rods 7 engage.

The component rolling rod holder 23 can also be omitted, when the centering spring 25 alone takes charge of the rolling rod mounting. Additionally the rod circulating mechanism 8 in the vicinity of the drive wheel 10 at the entrance end of the press is arranged with press chains 30 guided over guide wheels 29.

I claim:

1. In a belt-type press for making fiberboard, particleboard, and the like pressedboard products comprising an endless upper press belt circulated over at least one upper belt guide roller, a corresponding endless lower press belt circulated over at least one lower belt guide roller, said upper and lower press belts forming a pressing gap in a pressing region, and a press framework having lower and upper platens as well as a drive mechanism, whereby in said pressing region between each of said upper and lower platens and the corresponding one of said upper and lower press belts a rod container is positioned from which a plurality of rolling rods are fed with spacing from each other, and are guided by one of an upper and lower rod circulating mechanism, wherein said upper and lower rod circulating mechanism each comprise two first chains each guided over at least one sprocket and at least one first chain drive wheel, a plurality of interlinked chain link members having a plurality of chain bolts, a plurality of running rollers mounted on said chain bolts, and at least one guide rail for said running rollers, said rolling rods being attached between said two first chains with equalizing free play, at least one end of each of said rolling rods having a recess bored therein, in which one of a plurality of support bolts attached to one of said first chains engages so as to provide said equalizing free play, and wherein in an entrance region of said pressing gap and of said upper and lower platens upper and lower second chain each having a plurality of chain rollers in a triangular configuration, each of said second chains being guided over at least one second chain guide wheel, are positioned, said rolling rods between said first chains being guided on said chain rollers similar to roller bearings, the improvement wherein each of said chain link members is provided with at least one rolling rod holder on the end of said chain link member furthest from said guide rails and closest to said press belts in said pressing region, said rolling rod holder allowing said equalizing free play, said first chains have a chain bolt play between said chain bolts and said chain link members, and said second chains being set up as aligning means for said rolling rods to be aligned perpendicularly to the circulating direction of said rolling rods, and are constructed so as to be partly flexible with compensating play.

2. The belt-type press according to claim 1 wherein said rolling rods are fitted to said chain link members, and, depending on the dimensions of the components of said first chains, have a plurality of elongated support bolt holes running in said circulating direction of said first chain elongated so as to provide said equalizing free play; said support bolts of said rolling rods are inserted in said elongated support bolt holes; and by a centering spring are held in each of said chain link members and centered contact-free with respect to said circulating direction.

3. The belt-type press according to claim 1 wherein said rolling rod holders are formed as said centering springs attached to said chain link members.

4. The belt-type press according to claim 3 wherein each of said rolling rod holders has two elongated support bolt holes and two of said rolling rods are supported by two of said support bolts mounted in said elongated support bolt holes.

5. The belt-type press according to claim 3 wherein each of said chain link members has a mounting bar, on which said centering spring is mounted, said centering spring being substantially M-shaped having two curved legs shaped so as to engage and fit two adjacent ones of said support bolts.

6. The belt-type press according to claim 1 wherein said rolling rod holder and said centering spring are placed on said chain link members.

7. The belt-type press according to claim 1 wherein every second chain link member has a plurality of elongated chain bolt holes for said chain bolts, said elongated chain bolt holes being elongated and distributed in said circulating direction of said rolling rods so as to provide said chain bolt play.

8. The belt-type press according to claim 1 wherein said second chain has said chain rollers rolling on each other and by that provides said equalizing free play of said first chains.

* * * * *